Patented Nov. 2, 1948

2,452,736

UNITED STATES PATENT OFFICE 2,452,736

METHOD OF TREATING OIL WELLS

Allen G. Eickmeyer, Salt Lake City, Utah, assignor of one-fourth to Charles M. McKnight, Tulsa, Okla.

No Drawing. Application August 28, 1945, Serial No. 613,226

4 Claims. (Cl. 252—8.55)

This invention relates to the treatment of an oil well, and more particularly to the treatment of the calcareous materials in the production strata of a well by the use of surface active organic chemicals to render the production strata preferentially wettable by oil rather than by water to increase the proportion of oil and decrease the proportion of water produced by the well. This application is a continuation in-part of applicants' co-pending application, Serial No. 441,749, entitled Method of treating oil wells, filed May 4, 1942 (now abandoned).

In the production of oil it is known that the materials making up the production strata have a greater affinity for the adsorption of water at the solid surface than that of oil. This characteristic together with the oil-water interfacial tension creates a pressure in the pore spaces of the production strata tending to displace the oil by water and thereby reducing production of oil. As a consequence in wells that have a high water saturation in the production strata, ordinarily the amount of water produced is substantially greater than that of oil. Once water penetrates the production strata it is difficult to retard the flow and maintain any substantial oil production.

Heretofore many previous methods, both mechanical and chemical, have been utilized to maintain the desired oil production from a producing well. In the chemical treatment of a well, the numerous patents granted to Garrison, such as Re. 21,916 and No. 2,246,726, have disclosed a method of depositing within the production sand a precipitate which is preferentially oil wettable. The precipitate is substantially of a solid or semi-solid phase such as insoluble salts of sulfonated sludge or heavy metal sulfides. In this type of treatment it is usually necessary to pretreat the production strata by dehydration, or flushing the production strata to remove clay and silt as well as to dissolve the naturally occuring calcium and magnesium compounds thereby involving more than one step, other than the depositing of the precipitate.

The present invention consists of treating oil wells with a surface active agent which is absorbed on the surface of the production strata to render said strata preferentially oil wettable and water repellant. This treatment of the production strata is such that the pressure resulting from the oil-water interfacial tension is reversed in direction causing the water to be displaced by the oil and thus retard the invasion of water.

It is an important object of this invention to treat a producing oil well so as to retard the invasion of water into and through the production strata.

A further object of this invention is to treat a producing oil well so as to cause the production strata to be preferentially oil wettable and water repellant whereby the pressure resulting from the oil-water interfacial tension is reversed in direction.

And still another object of this invention is to treat an oil well with a surface active chemical which becomes adsorbed on the solid surface of the production strata to form a film that is substantially mono-molecular in thickness.

And still another object of this invention is to treat an oil well prior to a shut down with a surface active chemical to cause the production strata to be preferentially oil wettable and water repellant, in order to prevent water flooding during the shut in period.

And still another object of this invention is to provide a treatment for an oil well that causes preferential oil wettability of the porous strata wherein said treatment is adaptable to both primary and secondary recovery.

Other objects and advantages of my invention will be evident in the following detailed description which illustrates my new invention.

In accordance with the present invention an oil well is treated by subjecting a surface active re-agent to the ordinarily water-wet production strata adjacent the eduction area for the produced oil, so as to render the production strata less permeable to water and more permeable to oil. The surface active agent contained in the treating solution becomes adsorbed upon the solid surface of the pores in the production strata to render the production strata preferentially oil wettable and water repellant. The surface active chemical has oleophillic characteristics and upon adsorption causes the treated surfaces to be wetted more readily by oil than by water. The film or layer created by the adsorption is believed to be substantially mono-molecular in thickness and to be oriented so that the polar group of the re-agent is attracted to the solid surface of the strata, and the oleophillic non-polar hydrocarbon group of the reagent is directed outwardly away from the solid surface to attract the oil. Thus, in a production strata where oil and water are both attempting to wet the pores of the strata, the treated surface is preferentially wet by the oil. The pressure resulting from the oil-water interfacial tension is reversed in direction tending to cause the water in the production strata to be displaced by the oil. It will then be apparent that progressive displacement of water effects a retardation of water production from the porous strata, simultaneously permitting flow of oil.

The surface active chemicals or combination of chemicals found to be suitable for limestone wells and wells having basic or calcareous cementation of siliceous sands in the production strata are compounds capable of forming anions having oleophillic characteristics. Typical of such compounds are the higher fatty acids and compounds and soaps of those acids. To be effective, the compound should have an aliphatic group containing at least ten carbon atoms. The higher molecular weight fatty acids, such as oleic, palmitic, and stearic acids and their soaps have been found satisfactory. However, the alkali metal soaps are less effective than the free fatty acids or their soaps formed by reaction with weak organic bases, such as the high molecular weight amines. The reason is believed to be that as the anions of an alkali metal soap are adsorbed on the calcareous material, the pH increases until an equilibrium is reached, after which no further adsorption of the reagent takes place. The free fatty acid or soap of a weak base prevents the pH from rising appreciably by virtue of the buffering action, and therefore permits greater utilization of the reagent, which results in better performance of the oil well after treatment.

A greater number of soaps of high molecular weight amines are suitable. Examples of these are dodecylamine oleate, palmitate, and stearate; octadecylamine oleate, palmitate, and stearate; octadecenylamine oleate, palmitate, and stearate. In general the primary, secondary and tertiary amines having at least one aliphatic radical containing at least 10 carbon atoms are satisfactory organic bases to react with the fatty acids to produce organic soaps suitable for the process. Quaternary amines, however, are strong bases and therefore are not satisfactory buffering agents.

Several methods of applying the treating solution to the porous formation surrounding the well bore can be utilized as for example, injection of an aqueous solution or emulsion of the surface active re-agent into the well. In the above application it may be necessary to temporarily keep the well shut down after treatment in order to allow the oil present in the production strata to displace the water, so that upon resuming production of the well the water is retarded and not produced in any substantial quantities. In lieu of shutting the well down and still prevent an inrush of water after treating, it is advisable to inject into the porous strata a sufficient volume or quantity of oil to cause displacement of the water from the treated strata. The preferred method of applying the treating solution is injecting an oil solution of the re-agent into the porous strata followed by a quantity of oil to insure displacement of the solution some distance into the structure.

The more effective methods of introducing the surface active chemical re-agent, in any combination whatsoever, is dependent upon the characteristics of the particular well, as well as the amount of the re-agent used and the concentration of the re-agent in the solution. It is to be understood that no particular method of introducing the treating solution to the well is claimed as part of this invention. However, it will be apparent that the treating solution must be injected into the well with sufficient pressure to overcome any bottom-hole pressure present in the production strata, in order to allow the treating solution to flow considerable distance through the interstices of the porous strata.

The organic soaps and the higher fatty acids are essentially water insoluble but readily oil soluble. However, suitable aqueous emulsions of the organic soaps or the higher fatty acids can be used.

In treating an oil well by this process, two effects are desired to be accomplished; treatment of the water producing porous strata surrounding the well bore or shot-hole, and displacement of water in the treated strata by oil. This is economically accomplished by utilizing an oil solution of the re-agent and injecting this solution into the well by use of formation packers if necessary to localize the injection. Either crude oil or a refinery product may be used as the solvent. The optimum concentration of re-agent and volume of solution is dependent upon the size and characteristics of the oil well. As an example, concentrations of about 1 to 30% or more of the re-agent in about five to several hundred barrels of oil are suitable. However, it is advisable to drive the solution back into the water producing strata by some means such as pumping in a load of crude oil on top of the solution.

Another method of treating the production strata and facilitating the displacement of water from the strata is the utilization of a mixture of re-agents in which both water and oil are soluble. An example of such a mixture is about 30% by weight of octadecylamine oleate and 70% of n-butanol. Many suitable mixtures may be made up from a soap and an alcohol containing at least three carbon atoms, wherein the soap and alcohol are in widely varying proportions. This type of solution may be diluted by addition of oil.

From the foregoing it will be apparent that this process can be utilized for calcareous treatment of any producing oil well in which the production strata has become or may become substantially water flooded. The process is adaptable to both primary and secondary recovery. Furthermore, it could be adapted for preventing the invasion of water in a well that is to be shut down for a period of time for any reason whatsoever. In the latter case, where a well is shut down, treatment of the well prior to the shutting in period, causing the production strata to become preferentially oil wettable, maintains oil in the preferentially oil wettable strata, and thus prevents any inroads of water during the shut down period.

While I have disclosed what I now consider to be the preferred embodiment of the invention in such manner that they may be readily understood by those skilled in the art, I am aware that changes may be made in the details without departing from the spirit of the invention as explained in the claims.

What I claim is:

1. The method of treating an oil well which consists of subjecting the porous strata adjacent the well to a surface active agent consisting of a fatty acid containing at least ten carbon atoms and an oil soluble amine soap of said acid to render the calcareous porous strata thereof preferentially oil wettable and water repellant.

2. The method of treating an oil well which consists of subjecting the porous strata consisting partially of calcareous material to an oil soluble agent consisting of an organic compound selected from a group composed of fatty acids and their soaps having an aliphatic radical containing at least ten carbon atoms to render the porous strata preferentially oil wettable.

3. The method of treating an oil well which consists of subjecting the porous strata adjacent the well and consisting wholly or in part of calcareous material to a fatty acid containing at least ten carbon atoms to render the porous strata preferentially oil wettable and water repellant.

4. The method of treating an oil well which consists of subjecting the porous strata adjacent the well and consisting only partially of calcerous material to a fatty acid containing at least ten carbon atoms in order to render the porous strata preferentially oil wettable and water repellant.

ALLEN G. EICKMEYER.

REFERENCES CITED

The following references are of record in the file of this patent:

UNITED STATES PATENTS

| Number | Name | Date |
|---|---|---|
| 2,164,445 | Kennedy | July 4, 1939 |
| 2,327,017 | Chamberlain | Aug. 17, 1943 |
| 2,331,594 | Blair | Oct. 12, 1943 |
| 2,341,500 | Detling | Feb. 8, 1944 |
| 2,342,106 | Jones | Feb. 22, 1944 |
| 2,345,713 | Moore et al. | Apr. 4, 1944 |
| 2,356,205 | Blair | Aug. 22, 1944 |